Sept. 1, 1931. H. D. CHURCH 1,820,961
CLUTCH BRAKE
Filed Feb. 24, 1927 2 Sheets-Sheet 2
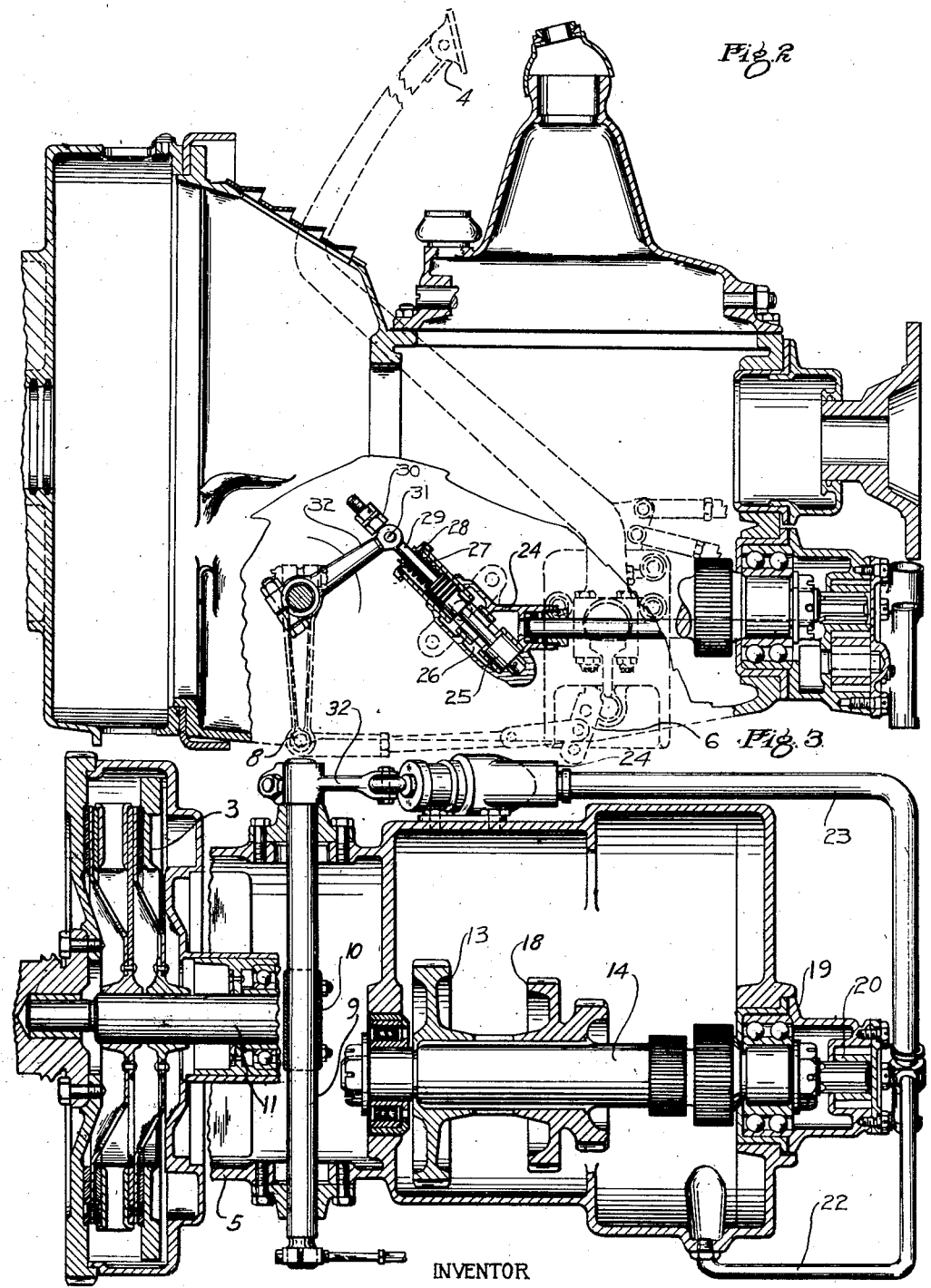
INVENTOR
HAROLD D. CHURCH
BY
Richey & Watts
ATTORNEYS Patented Sept. 1, 1931

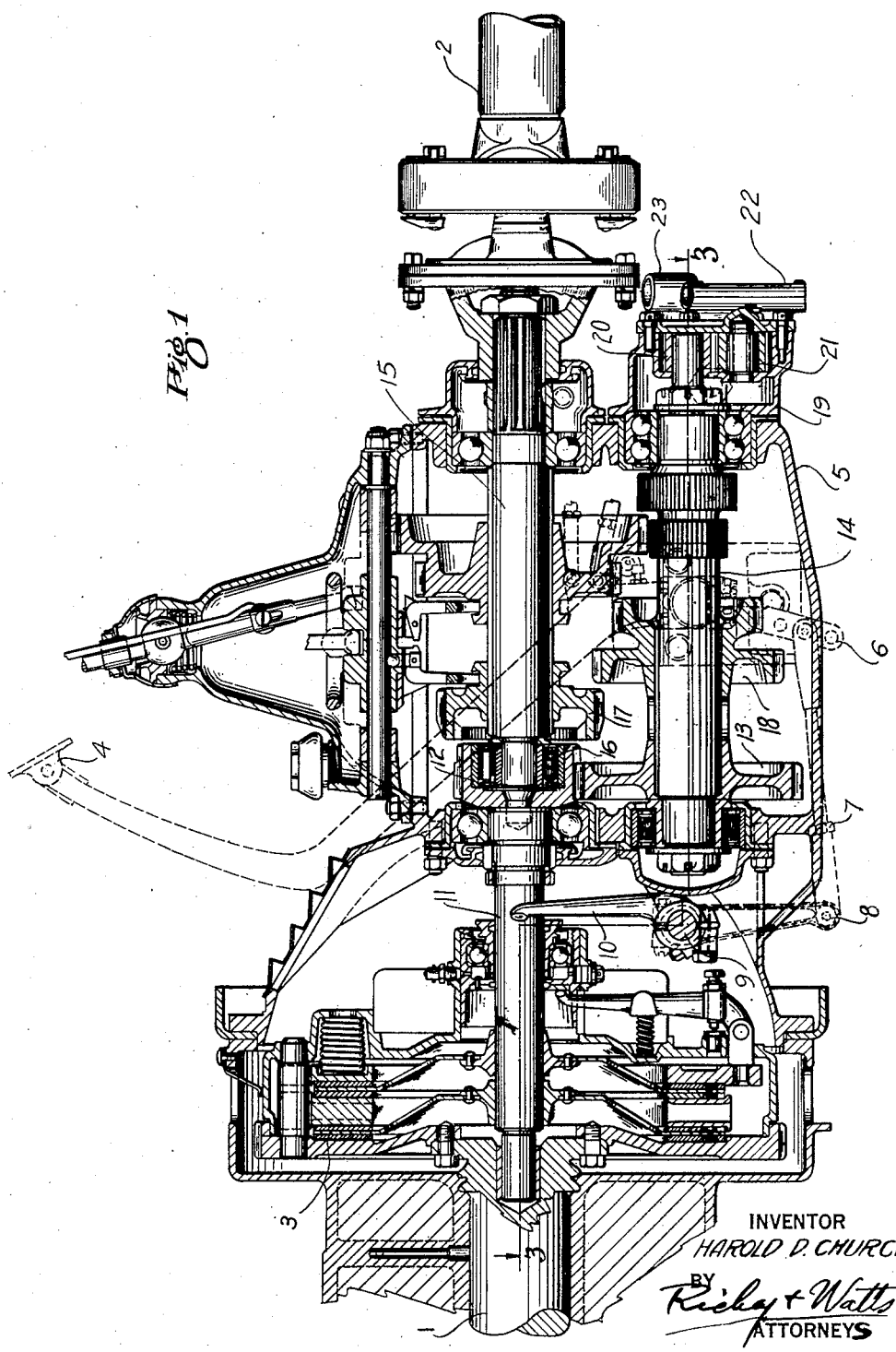

1,820,961

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

CLUTCH BRAKE

Application filed February 24, 1927. Serial No. 170,478.

This invention relates to power transmission gearing in which series of gears may be engaged to vary the relative speed and/or direction of the shafts from which and to which the power is being transmitted. It is particularly applicable to the transmission gearing of automotive vehicles and especially advantageous in trucks and other large vehicles where the power is considerable and the parts must therefore be heavy.

In general, the usual "selective" type of gear shift has been considered convenient and satisfactory in use on pleasure and other light vehicles. Its use has been attended with serious difficulty when applied to trucks, tractors and other vehicles where large amounts of power must be transmitted and in which the transmitting clutches, etc. must consequently be relatively heavy. In transmissions where the weight of the parts is considerable the motor shaft tends to keep the parts rotating, even when a clutch or the like between the parts and the motor is disengaged and when they are disconnected from the wheels of the vehicle. This frequently makes it difficult to shift gears as the gear teeth are apt to meet end to end instead of sliding into mesh and, due to their motion, discordant noises are produced or the teeth may become chipped or broken.

It has heretofore been proposed to arrest the movement of the parts of the transmission in some manner so that these will come to rest shortly after the clutch has been disengaged, and thus facilitate the shifting of gears. However, none of the devices heretofore produced will satisfactorily produce this result and moreover they quickly become worn and inoperative.

I have provided means by which the speed of the parts within a transmission or the like may be readily controlled, in which the control may be made automatic upon operation of the clutch, in which wear does not readily occur, and in which such wear as does occur may be readily compensated for.

The invention will be better understood from the description of one practical embodiment thereof illustrated in the accompanying drawings in which—

Fig. 1 is a longitudinal sectional view of an automobile transmission and clutch, provided with apparatus embodying my invention;

Fig. 2 is an enlarged fragmentary section taken on a plane parallel to that of Fig. 1, but with parts omitted or broken away; and Fig. 3 is a horizontal section taken on the line 3—3 of Fig. 1.

The crankshaft of the engine or motor by which the vehicle is propelled is shown at 1 and delivers power to the propelling shaft 2 of the vehicle 1 through a clutch 3 and transmission gearing of the selective type.

A pedal 4 is provided for operating the clutch, the pedal being pivoted upon a casing 5 which surrounds the transmission gearing. The lower end 6 of the pedal lever is connected by an adjustable link 7 to a lever 8 mounted on a shaft 9, which extends into the interior of the housing or casing 5 and is provided with a forked arm 10 which engages the clutch mechanism. It will thus be seen that the downward movement of the pedal 4 moves the arm 10 in a forward direction, releasing the clutch.

Extending rearwardly from the clutch is a short shaft 11 carrying on its rear end a pinion 12 which delivers power to the transmission gearing. Meshing with the pinion 12 is a gear 13 carried on a countershaft 14, these two gears remaining always in mesh. Other gears are carried by the back shaft and by a driven shaft 15 coaxial with the shaft 11 and having its forward end carried in a bearing 16 within pinion 12. The gears may be moved relatively of each other to connect the driven shaft to the drive shaft in any one of a plurality of gear ratios. For example, gear 17 having internal teeth, may be slid over the end of pinion 12 and the shafts thus directly connected, or gear 17 may be moved into mesh with gear 18, carried by the countershaft, and the driven shaft thus moved at a lower speed in relation to that of the drive shaft. The operation of these gears and shaft, however, may be of any known or desired construction. The back shaft 14 is continued through the rear wall to the housing 5 and its end is surrounded by a casing 19 hereinafter referred to as a pump casing. Upon the end of the shaft and within the pump casing is a pinion 20 and this pinion in turn meshes with the second pinion 21 carried by a shaft supported by the walls of the pump casing.

The pump casing fits about the pinions so that they cooperate with each other and the casing in the manner of the usual gear pump. This pump draws oil which is used for lubricating the gears within the transmission housing through its inlet pipe 22 and discharges it through an outlet pipe 23. This discharge pipe leads to a valve casing 24, from which casing is an opening discharging into the transmission housing so that the oil is pumped from one part of the housing to another.

Within the valve casing is a balanced piston valve 25 controlling the inlet port 26, by which the oil is received from pipe 23, the piston being held in its lowermost position to completely uncover the port by a spring 27, retained in place by a cap 28. A rod or stem 29 extends outwardly through the cap and is threaded and provided with lock nuts 30 for adjustably locating a trunnioned sleeve 31 upon the stem. The trunnions on the sleeve are carried in the bifurcated ends of a lever 32 carried upon the end of shaft 9. During the ordinary operation of the vehicle when the parts of the transmission are all rotated, the oil is pumped freely through the pipes above described and the resistance imposed upon the pump gearing is negligible. It will be seen that when the clutch pedal is depressed to disengage the clutch, lever 32 is moved upwardly until sleeve 31 engages the lock nut 30, and further upward motion moves the entire valve upward, restricting port 26 and thus increasing the load upon pumping gears 20 and 21. This increase of load, of course, will retard the rotation of back shaft 14, and if the load is sufficient will completely stop the same, also stopping the rotation of driving shaft 11 through gear 13 and pinion 12. By adjusting the lock nuts 30, the area of the opening at port 26 when the pedal is completely down, may be varied from being entirely closed to wide open. The amount of resistance necessary to stop the gears may thus be readily obtained and any wear in the gear pump may be readily compensated for without adjusting any part within the transmission housing.

In order that the lubricant may pass properly through the pump, I find it desirable to use a heavy oil rather than a grease for lubricating the transmission gears. However, a fluid grease should operate satisfactorily.

While I have described the illustrated embodiment of my invention in some particularity, this embodiment is shown only by way of illustration and not by way of limitation, and I do not, therefore, limit myself to the precise details shown and described, but claim as my invention all embodiments thereof coming within the scope of the appended claims:

I claim:

1. A power transmission device comprising a drive shaft, a driven shaft, a clutch, power transmission gearing between said clutch and driven shaft, a pump driven by said power transmission gearing, and normally freely circulating fluid, a valve for restricting the flow of said fluid, and means for automatically actuating said valve when the clutch is disengaged.

2. A power transmission device comprising a drive shaft, a driven shaft, a clutch and power transmission gearing between said drive and driven shafts, a housing enclosing said transmission gearing, a fluid pump driven by said transmission gearing and drawing lubricant from said housing and discharging to another point in the housing, a valve controlling the discharge of said lubricant, and automatic means for actuating said valve when the clutch is actuated.

3. Power transmission mechanism comprising a drive shaft, a driven shaft, a clutch engageable to transmit power from said drive shaft to a pinion, a back shaft carrying a gear driven by said pinion, gears carried by said back shaft and selectively engageable with gears carried by said driven shaft, a housing surrounding said gearing and containing a lubricant, a rotary pump driven by said back shaft and having an inlet within said housing and a discharge to another point in said housing, a balanced valve controlling the discharge from said pump and automatically actuated to restrict said discharge when the clutch is disengaged.

4. A power transmission device comprising a driven shaft, a clutch, power transmission gearing between said clutch and driven shaft, a fluid brake for the gearing, and a single actuator for disengaging the clutch and applying said brake after the clutch is disengaged.

5. In combination with a drive shaft and a driven shaft, a clutch interposed therebetween, means for transmitting power from said clutch to said drive shaft, a fluid brake for stopping said power transmission means, a valve controlling the operation of said fluid brake, an actuator for said clutch, and a connection between said actuator and valve for operating said valve after the clutch has been disengaged.

6. In combination with a drive shaft, and a driven shaft, power transmission gearing between said shafts, a clutch between the gearing and the drive shaft, a fluid pump actuated by said transmission gearing and free to pump fluid without substantial resistance, a control valve for increasing the resistance of said fluid to cause the pump to act as a brake upon said transmission gearing, an actuator connected to said clutch, and a connection from the actuator controlling the valve.

7. In combination with a drive shaft and a driven shaft, a back shaft and clutch interposed therebetween, an actuator for the clutch, the back shaft being provided with a gear, an idle gear meshing therewith, the two gears constituting a fluid pump, a valve for controlling the resistance of fluid passing through the pump, and an operating connection between said valve and said actuator.

8. In a motor vehicle, the combination of a motor, a clutch for transmitting the power of said motor, transmission mechanism associated with said clutch to receive power therefrom and including change speed gearing, means for operating said clutch, and means for exerting a rotation resisting force on certain of said gearing varying with the speed of such gearing, said means being actuated by said clutch operating means.

9. In a motor vehicle, the combination of a motor, a clutch for transmitting the power of said motor, transmission mechanism associated with said clutch to receive power therefrom and including change speed gearing, means for operating said clutch, and fluid brake means actuated by said clutch operating means for controlling the speed of certain of said gearing to facilitate shifting from one speed to another.

In testimony whereof I hereunto affix my signature this 17th day of February, 1927.

HAROLD D. CHURCH.